United States Patent [19]

Shiraishi et al.

[11] 3,970,739

[45] July 20, 1976

[54] PROCESS FOR CONCURRENTLY TREATING PROCESS WASTE WATERS AND FLUE GASES FROM AMMONIA SYNTHESIS PROCESS PLANTS

[75] Inventors: Tatsuo Shiraishi; Hiroshi Fukusen; Sachio Oishi; Shinkichi Shimizu; Hiroyuki Nishikawa; Tetsu Wakabayashi, all of Niihama, Japan

[73] Assignee: Sumitomo Chemical Company, Limited, Japan

[22] Filed: Dec. 6, 1974

[21] Appl. No.: 530,302

[30] Foreign Application Priority Data
Apr. 11, 1974  Japan.............................. 49-41219

[52] U.S. Cl............................. 423/23 S; 423/237; 423/239; 423/245
[51] Int. Cl.².......................................... C01B 21/00
[58] Field of Search .................. 423/237, 23 S, 351, 423/652, 359, 245, 239

[56] References Cited
UNITED STATES PATENTS

| | | | |
|---|---|---|---|
| 2,975,025 | 3/1961 | Cohn et al. .......................... | 423/239 |
| 3,328,115 | 6/1967 | Keith et al. .......................... | 423/239 |
| 3,467,491 | 9/1969 | Hardison.............................. | 423/237 |
| 3,615,166 | 10/1971 | Hindln et al. ........................ | 423/239 |
| 3,661,507 | 5/1972 | Breitbach et al. ................... | 423/237 |
| 3,812,236 | 5/1974 | Adams et al......................... | 423/237 |
| 3,840,471 | 10/1974 | Acres................................... | 423/239 |
| 3,880,982 | 4/1975 | Stenzel................................ | 423/239 |
| 3,885,020 | 5/1975 | Whelan................................ | 423/351 |

FOREIGN PATENTS OR APPLICATIONS 587,892   12/1959   Canada.............................. 423/237

*Primary Examiner*—Oscar R. Vertiz
*Assistant Examiner*—Eugene T. Wheelock
*Attorney, Agent, or Firm*—Stewart and Kolasch, Ltd.

[57] ABSTRACT

The process involves stripping ammonium nitrogens and organic materials, as gases, which are present in process waste waters to be discharged from plants wherein gases for use in ammonia synthesis are manufactured by reforming hydrocarbons with steam, decomposing the organic materials selectively in the presence of a catalyst at a temperature of about 120° to 400° C., mixing the remaining gases with the flue gases from said plants so as to provide a gaseous mixture having ammonia therein in an amount of about 0.3 to 10 moles per mole of nitrogen oxides present in the flue gases, reacting the gaseous mixture over a catalyst at a temperature of about 150° to 700° C. and oxidizing the unreacted ammonia, if any, in the presence of a catalyst at a temperature of about 150° to 700° C. to render the nocuous substances innocuous.

19 Claims, No Drawings

PROCESS FOR CONCURRENTLY TREATING PROCESS WASTE WATERS AND FLUE GASES FROM AMMONIA SYNTHESIS PROCESS PLANTS

The present invention relates to a process for concurrently treating process waste waters and flue gases from an ammonia-synthesis gas manufacturing plant. More particularly, it relates to a process for concurrently removing noxious ammonium nitrogens and organic materials present in the process waste waters and nitrogen oxides present in the flue gases from ammonia-synthesis gas manufacturing plants.

In a process for manufacturing gases for use in ammonia synthesis by reforming hydrocarbons with steam, excess steam is condensed and discharged out of the system as process waste waters which contain by-product ammonia and organic materials, e.g., mainly, methanol and a small amount of amines, and process gas components, e.g., mainly, carbon dioxide.

The quantity and properties of the process waste waters, although varying depending upon the kind of raw materials to be used, operating conditions and the like, are usually as follows: 0.8 to 2.2 cubic meters of the process waste waters per ton of product ammonia; temperature, 70° C. to 100° C.; pressure, 10 to 30 atmospheric pressures; and the concentration of dissolved ingredients: ammonia, 500 to 1,500 mg. per liter; carbon dioxide, 1,500 to 4,000 mg. per liter; and organic materials, 700 to 2,500 mg. per liter.

Ammonium nitrogen present in waste waters is considered to be one of the major causes of problems associated with nutritive fresh and sea waters, i.e. the abnormal growth of duckweeds or seaweeds, and organic materials present therein may increase the chemical oxygen demand (C.O.D.), so that removal of these materials is an urgent matter of today from the point of view of preventing water contamination.

Processes for removing ammonium nitrogens and organic materials from process waste waters have heretofore been proposed: the stripping method by means of air or steam; the ion exchange method; the adsorption method by means of activated carbon or other adsorbents; the biochemical methods; and the like. However, these methods are unsatisfactory in meeting technical and economical demands. For instance, the stripping of the process waste waters by air or steam produces gases containing ammonia and organic materials which, when discharged directly into the atmosphere, will cause atmospheric pollution and be brought back again with rainfalls to the ground, so that this method does not give a fundamental solution to environmental contamination and pollution. If ammonia is recovered from the stripped gases by recondensation or absorption in water, such an ammonia solution is obtained in an extremely low concentration of about 1 per cent by weight or less at the most and also contains organic materials to some extent. Thus such a recovered solution is not suitable for industrial reuse.

In the ion exchange and adsorption methods, it is difficult to remove concurrently both ammonium nitrogens and orgnaic materials present in the process waste waters in an effective way. Those methods also present problems associated with the regeneration of the used ion exchange resin or adsorbents.

The biochemical methods involve decomposition of the organic materials and nitrification of the ammonia with aerobic microorganisms (bio-oxidation) or denitrification thereof with anaerobic microorganisms (bio-reduction). However, these methods have the disadvantages that sufficient degrees of conversion are not always achieved and large equipment is required for industrial application of these methods.

In a procedure for manufacturing gases for use in synthesizing ammonia by reforming hydrocarbons with steam, both the heat and the power required for the reforming reaction are generated by combusting the hydrocarbon fuels which may optionally be combined with a gas purged from the ammonia synthesis system. The flue gases from said procedure contain oxides of nitrogen such as nitrogen monoxide, nitrogen dioxide, and the like. The quantity and properties of the flue gases, although they are varied depending upon the kind of the fuels and operating conditions, are usually as follows: flue gases, 3,000 to 7,000 Nm.$^3$ per ton of product ammonia; temperature, 150° to 700° C.; and the components: 70 to 72% of nitrogen; 7 to 12% of carbon dioxide; 2 to 4% of oxygen; 0.7 to 1% of argon; 12 to 19% of steam; 200 to 500 p.p.m. of nitrogen oxides; and 0 to 500 p.p.m. of sulfur oxides, all values measured on the basis of the volume of the flue gases.

The nitrogen oxides present in the flue gases not only are toxic to the human body but are considered to be one of the substances causing photochemical oxidants, so that the control and removal of such nocuous nitrogen oxides are an urgent matter.

As a measure taken with respect to the reduction of nitrogen oxides there is known a method for suppressing the formation of the nitrogen oxides derived from the reaction of nitrogen and oxygen, by lowering the combustion temperature or the concentration of oxygen. However, this method is disadvantageous because of the reduction of nitrogen oxides to the extent of 50 per cent at most.

Some absorption methods by which nitrogen oxides are removed have also been found unsatisfactory because of a low absorption efficiency and the requirement of large equipment where nitrogen oxides are present in great dilution and the gases are employed in large quantities. These methods also present a problem associated with the treatment of the nitrogen oxides absorbed, so that they involve a technical difficulty and lack an economical advantage.

In addition thereto, there are methods which involve the catalytic reduction of nitrogen oxides by adding reducible gases such as hydrocarbons, carbon monoxide, hydrogen or ammonia to the flue gases which contain nitrogen oxides and by bringing the mixed gases into contact with a catalyst. Of these, the process wherein hyrocarbons, carbon monoxide or hydrogen are used permits these reducible gases to react preferentially with oxygen present in the flue gases and then to react with the nitrogen oxides after the oxygen present therein in large quantities was fully consumed. For this reason, a large quantity of the reducible gases is required. Furthermore, the heat of said reaction is so high that the temperature rise of a catalyst bed becomes remarkably high to a degree that the control of the temperature is rendered difficult. Such a high temperature also effects the catalyst life adversely.

The present inventors have completed the present invention as a result of combining a step of removing ammonia from the process waste waters with a step of removing nitrogen oxides from the flue gases, thereby rendering both of them concurrently innocuous. The concept which the present inventors investigated was based on the fact that in a system containing oxygen as in flue gases, nitrogen oxides can be reduced to free nitrogen and steam by selective reaction with ammonia in the presence of a catalyst and that ammonia in process waste waters is present in an amount almost equivalent to the nitrogen oxides in the flue gases.

Accordingly, it is an object of the present invention to provide an industrially advantageous technology for preventing a public hazard. Another object of the present invention is to provide a process for rendering both ammonium nitrogens and organic materials in process waste waters and nitrogen oxides in flue gases concurrently innocuous by conversion into free nitrogen, carbon dioxide and steam, thereby removing those nocuous materials from the wastes. A further object of the present invention is to provide a process which makes it possible to render process waste waters and flue gases concurrently innocuous, in which the ammonium nitrogens and organic materials present in the process waste waters are stripped in the form of gaseous ammonia and organic materials, the organic materials in the stripped gases are selectively decomposed in the presence of a catalyst, the resulting stripped gases are mixed with the flue gases, the ammonia present therein is catalytically brought into contact with nitrogen oxides and the unreacted ammonia, if any, is catalytically decomposed. Other objects, features and advantages of the present invention will become apparent during the course of the following description and claims.

The process of the present invention comprises stripping ammonium nitrogens and organic materials, as gases, which are present in process waste waters to be discharged from plants wherein gases for use in ammonia synthesis are manufactured by reforming hydrocarbon with steam, decomposing organic materials selectively in the presence of a catalyst at a temperature of about 120° to 400° C., mixing the remaining gases with flue gases so as to contain ammonia in an amount of about 0.3 to 10 moles per mole of nitrogen oxides present in the flue gases, reacting the gaseous mixture over a catalyst at a temperature of about 150° to 700° C. and decomposing the unreacted ammonia, if any, in the presence of a catalyst at a temperature of about 150 to 700° C.

The process of the present invention will be explained in more detail hereinbelow. In accordance with the present invention, process waste waters discharged from ammonia-synthesis gas manufacturing plants are first fed into the upper part of a stripping tower in which a portion of the process waste waters introduced is evaporated and at the same time a large portion of ammonia, carbon dioxide and organic materials present in the process waste waters is stripped by heating the waters indirectly by means of a reboiler or by introducing superheated steam or hot air or a portion of the flue gases directly into the lower part of the tower. With the operating conditions of the stripping tower appropriately selected, ammonia, carbon dioxide and organic materials remaining in the waste waters which are discharged from the bottom of the tower after being treated can be reduced to concentrations of 20 mg. or less, 40 mg. or less and 50 mg. or less, respectively, per liter of the discharged waste waters. The discharged waste waters may be reusable as a boiler feedwater or for other industrial waters.

A stream of the stripped gases which contain a large portion of ammonia, carbon dioxide and organic materials of the process waste waters introduced is discharged from the top of the tower and led, after being adjusted to a specified temperature, to a reactor packed with a catalyst capable of decomposing the organic materials selectively. Further, the steam present in the hot stripped gases may be condensed by cooling said gases by any proper means or using said gases as a heat source for other purposes. The condensed water may be then refluxed into the upper part of the stripping tower, so that the amount of the stripped gases to be treated can be reduced and the concentration of ammonia, carbon dioxide and organic materials can also be increased.

This procedure is provided to remove what may be termed a secondary pollutant which may be formed in the course of the subsequent procedure for reducing nitrogen oxides in the flue gases, thereby preventing a so-called secondary pollution. For it has been found that hydrogen cyanide which is extremely toxic to humans can be formed where a catalyst generally used idustrially in a step of reducing nitrogen oxides present in the flue gases with ammonia is employed in a system in which the organic materials components in the process waste waters (mainly, methanol and a small amount of amines) are present. This phenomenon is considered to result from the reaction or ammoxidation of methanol with ammonia and oxygen in the gases.

This step of the process of the present invention permits the selective decomposition of only the organic materials including mainly methanol and a small amount of amines present in the stripped gases, but it can leave the ammonia unreacted, so that the remaining ammonia is utilized effectively in the following reduction of nitrogen oxides without forming toxic hydrogen cyanide. Where oxygen is present in the stripped gases as in a system in which the process waste waters are stripped with an oxygen-containing gas such as air or flue gases, carbon dioxide and steam are produced as follows:

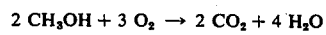

Where no oxygen is present but a large quantity of steam is present in the stripped gases as in a system in which the process waste waters are stripped by indirectly heating with a reboiler or by directly feeding superheated steam into a stripping tower, carbon dioxide and hydrogen are produced according to the following reactions:

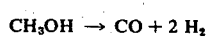

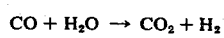

The hydrogen that is formed therein is readily oxidized by oxygen present in the flue gases to steam in the following step for reducing nitrogen oxides, so that methanol is eventually discharged as innocuous carbon dioxide and steam in either case.

Illustrative of the catalysts to be used in the step of the decomposition of the organic materials in the present invention are, for example, one or more metals including, for example, iron, nickel, chromium, zinc or copper or oxides of such metals. The catalysts may be preferably nickel oxide, iron oxide-chromium oxide, zinc oxide-copper oxide or zinc oxide-chromium oxide. The use of these catalysts in a system in which oxygen is present together with methanol and ammonia is found to decompose methanol according to the above-mentioned reactions without forming hydrogen cyanide.

The reaction temperature may vary depending upon the catalyst to be used and the composition and space velocity of the stripped gases. The temperature may vary from about 150° to 400° C. in the absence of oxygen in the stripped gases and from about 120° to 250° C. in the presence of oxygen therein. Where no oxygen is present in the stripped gases, the application of a temperature lower than the lower limit will decrease the decomposition of the organic materials and temperatures higher than the upper limit will make the catalyst sintered, resulting in a decrease in the catalytic activity and in the shortening of the catalyst life. Where oxygen is present in the stripped gases, temperatures below the lower limit will decrease the decomposition of the organic materials, and the use of a temperature above the upper limit may cause the oxidation of ammonia present in the stripped gases and result in the formation of nitrogen oxides.

The space velocity of the stripped gases may vary to some extent, depending upon the catalyst to be used, the composition of the stripped gases and the reaction temperature and may usually range from about 500 to 50,000 hr.$^{-1}$ and preferably from about 1,000 to 30,000 hr.$^{-1}$ The space velocity below the lower limit may permit a high decomposition of the organic materials, but it is disadvantageous in view of industrial economy because of the necessity of large equipment, and the use thereof beyond the upper limit may cause a decrease in the decomposition of the organic materials.

The stripped gases treated in said step are then mixed with the flue gases. If necessary, an additional amount of ammonia may be added. The ammonia to be additionally fed may be in the form of a gas or as an aqueous ammonia. The ammonia may also be added as an aqueous solution of salts such as ammonium carbonate which can be easily decomposed into ammonia under conditions where a mixture of the said stripped gases and the flue gases is treated.

A stream of the gaseous mixture is adjusted to a specified temperature and led to a reactor packed with a catalyst capable of reducing nitrogen oxides with ammonia. In this step, nitrogen oxides are catalytically brought into contact with ammonia and converted to innocuous free nitrogen and steam. In this step, the ammonia present therein reacts preferentially with the nitrogen oxides, but a portion of the excess amount of the ammonia is converted to nitrogen and steam by reaction with oxygen present in the flue gases if the type of catalyst used or other circumstances allow. The catalyst to be used for this purpose in this step of the process of the present invention includes, for example, a noble metal such as, for example, platinum or palladium, oxides of a metal such as, for example, copper, vanadium, molybdenum or tungsten or a metal complex oxide such as, for example, an iron-chromium complex oxide, a copper-chromium complex oxide or a manganese-chromium complex oxide and other catalysts known to the art to be effectively used for this purpose. A complex oxide containing vanadium and a component X in which X may be one or more of copper, zinc, tin, lead, titanium, phosphorus, chromium, cobalt, nickel, tungsten and molybdenum or a complex oxide containing chromium and a component Y in which Y may be one or more of nickel, cobalt, zinc, molybdenum, tungsten, tin, phosphorus and titanium may also be used.

The reaction temperature may vary with the compositions of the catalyst, the composition of the gaseous mixture and the space velocity thereof and may usually vary from about 150° to 700° C. and preferably from about 150° to 500° C. The temperatures below the lower limit may bring about a difficulty in the reaction between ammonia and the nitrogen oxides, and the application of temperatures above the upper limit may cause a decrease in the conversion of nitrogen oxides to innocuous materials.

The mixed gases may be passed over the catalyst at a space velocity ranging from about 2,000 to 100,000 hr.$^{-1}$ and preferably from about 6,000 to 30,000 hr.$^{-1}$ Although the use of a space velocity of less than the lower limit can give a high conversion of the nitrogen oxides, it is not economically advantageous because a large capacity reactor and a great amount of the catalyst is required and an increase in the differential pressures between the catalyst layers is caused. A space velocity higher than the upper limit may decrease the conversion of nitrogen oxides into innocuous materials.

A molar ratio of ammonia to nitrogen oxides in the mixed gases may range from about 0.3 to 10 moles, preferably from about 0.7 to 5 moles, to one mole of nitrogen oxides or a mixture of nitrogen monoxide and nitrogen dioxide. It is desired to use ammonia in an amount more than the stoichiometric amount required to reduce nitrogen oxides to free nitrogen. The employment of the ammonia in an amount less than the lower limit may not achieve a sufficiently high conversion of nitrogen oxides from the point of view of stoichiometry. The use of ammonia in an amount greater than the upper limit of the stated ammonia to nitrogen oxides molar ratio may cause ammonia to remain still unreacted even subsequent to the following step where ammonia is decomposed by oxidation, so that the unreacted ammonia, when discharged without further treatment, may cause a secondary air pollution.

Although, in order to achieve a high conversion of nitrogen oxides, it is desired to employ ammonia in an amount greater than the stoichiometric amount required for the reduction of nitrogen oxides to free nitrogen, such a large quantity of ammonia may cause ammonia to remain unreacted in the gaseous mixture even after the step where nitrogen oxides are reduced. In this case, the unreacted ammonia can be removed by a procedure in which the ammonia is brought into contact with a catalyst capable of decomposing ammonia to thereby convert it to free nitrogen and steam. Thus this procedure can serve as the prevention of a secondary pollution which may be caused by the discharge of the unreacted ammonia. If no ammonia is left unreacted in the gaseous mixture resulting from the reduction of nitrogen oxides using ammonia, it is not necessary to provide this procedure with the treatment system.

This step, if necessary, may be carried out in a separate reactor each packed with a catalyst to be used for this purpose or in a reactor whose upper part relative to the passage of the mixed gases is packed with a catalyst capable of reducing nitrogen oxides with ammonia and whose lower part relative thereto is packed with a catalyst capable of decomposing ammonia by oxidation.

The catalyst to be used for the ammonia decomposition reaction includes catalysts known to the art as being capable of being used for this purpose. For example, an iron-chromium complex oxide is preferred. A chromium oxide or a chromium-magnesia complex oxide catalyst or an oxide catalyst containing chromium and a component Z in which Z is one or more of tin, antimony, vanadium, cobalt, phosphorus, zinc, nickel, titanium, molybdenum and tungsten may also be employed.

The reaction temperature for this step may vary depending upon the composition of the catalyst, and the composition and the space velocity of the mixed gases and may be usually from about 150° to 700° C., preferably from about 200° to 500° C. At a temperature below the lower limit, the ammonia decomposition reaction will become difficult to take place and at a temperature higher than the upper limit, the formation of nitrogen oxides by the reaction of ammonia with oxygen will increase to a great extent.

The space velocity of the mixed gases may be usually from about 2,000 to 100,000 hr.$^{-1}$ and preferably from about 6,000 to 30,000 hr.$^{-1}$ The space velocity below the lower limit can achieve a high decomposition of ammonia. However, the use of such a low space velocity is not economical because it requires a large capacity reactor and a great amount of catalyst and increases the differential pressure between the catalyst layers. The space velocity above the upper limit may cause a decrease in the ammonia decomposition.

The following examples illustrate the present invention without, however, limiting the same thereto. In the following examples, the amounts of ammonia, carbon dioxide, and organic materials present in the process waste waters to be treated are per liter of the process waste water.

EXAMPLE 1

A stripping tower having an inside diameter (I.D.) of 38 mm. and a bed height of 500 mm. packed with ⅛ inch stainless steel spiral rings was charged with process waste waters containing 770 mg. of ammonia, 2,000 mg. of carbon dioxide and 800 mg. of organic materials (mainly methanol and a small amount of amines) at a rate of 10 liters per hour into the upper portion thereof while being heated indirectly by means of a reboiler at a temperature of 130° C. and a pressure of 2.7 atmospheric pressures so as to strip 9.5% of the process waste water supply, leaving the water at a rate of 9.05 liters per hour. The water discharged contained 18 mg. of ammonia, 35 mg. of carbon dioxide and 50 mg. of organic materials, so that 97.9% of ammonia, 98.4% of carbon dioxide and 94.3% of the organic materials were stripped.

The stripped gases were composed, in a molar ratio, of 8,250 p.p.m. of ammonia, 8,330 p.p.m. of carbon dioxide, 4,380 p.p.m. of the organic materials and steam as the rest of the gases and were passed at a rate of 1.21 Nm.$^3$ per hour and a space velocity of 12,100 hour$^{-1}$ in a 50 mm. (I.D.) stainless steel reactor packed with 100 ml. of a zinc oxide-copper oxide catalyst system with a zinc to copper atomic ratio of 2 : 1 while being maintained at a temperature of 250° C., to produce gases, at a rate of 1.22 Nm.$^3$ per hour, which contained 7,900 p.p.m. of ammonia, 12,600 p.p.m. of carbon dioxide, 9 p.p.m. of the organic materials, 13,400 p.p.m. of hydrogen, 140 p.p.m. of nitrogen and steam as the rest of the gases, so that 99.8% organic materials and 3.4% of ammonia were decomposed.

Said gases were mixed at a rate of 1.22 Nm.$^3$ per hour with the flue gases containing, in a molar ratio, 70.8% of nitrogen, 9.1% of carbon dioxide, 2.8% of oxygen, 0.9% of argon, 16.4% of steam, 293 p.p.m. of nitrogen monoxide and 12 p.p.m. of nitrogen dioxide in an amount of 20 Nm.$^3$ per hour to give mixed gases containing, in a molar ratio, 66.8% of nitrogen, 8.6% of carbon dioxide, 2.6% of oxygen, 0.9% of argon, 21.0% of steam, 276 p.p.m. of nitrogen monoxide, 11 p.p.m. of nitrogen dioxide, 453 p.p.m. of ammonia and 770 p.p.m. of hydrogen in an amount of 21.22 Nm.$^3$ per hour.

The mixed gases were passed at a rate of 21.22 Nm.$^3$ per hour and a space velocity of 14,100 hour$^{-1}$ in a 100 mm. (I.D.) stainless steel reactor packed with 1.5 liters of a vanadium oxide-chromium oxide catalyst supported on activated alumina with a vanadium to chromium to aluminum atomic ratio of 9 : 3 : 120, while being heated at 350° C. The reactor outlet gases contain ammonia, nitrogen monoxide and nitrogen dioxide in concentrations of 185 p.p.m., 12 p.p.m. and 0.1 p.p.m., respectively. This means a 95.7% removal of nitrogen oxides. No free hydrogen was observed in the reactor outlet gases.

The reactor outlet gases were passed at a rate of 21.22 Nm.$^3$ per hour and a space velocity of 14,100 hour$^{-1}$ in a 100 mm. (I.D.) reactor packed with a chromium oxide and tungsten oxide supported on activated alumina with a chromium to tungsten to aluminum atomic ratio of 9 : 3 : 120 at a temperature of 350° C. to give reactor outlet gases containing 3 p.p.m. of ammonia, 8 p.p.m. of nitrogen monoxide and 0.1 p.p.m. or less of nitrogen dioxide with a conversion of ammonia of 98.4%.

EXAMPLE 2

The process waste waters containing the same composition were stripped in the same manner to give 9.05 liters per hour of the treated water and 1.21 Nm.$^3$ per hour of the stripped gases having the same compositions, as in Example 1.

Of the stripped gases, 0.5 Nm.$^3$ per hour of the stripped gases were passed in a 50 mm. (I.D.) stainless steel reactor packed with 100 ml. of a zinc oxide-chromium oxide catalyst with a zinc or chromium atomic ratio of 3 : 1 at a space velocity of 5,000 hour$^{-1}$ to give the treated gases having, in a molar ratio, 8,190 p.p.m. of ammonia, 12,700 p.p.m. of carbon dioxide, 57 p.p.m. of organic materials, 13,000 p.p.m. of hydrogen, 30 p.p.m. of nitrogen and steam as the rest thereof at a rate of 0.5 Nm.$^3$ per hour with a conversion of organic materials of 98.7% and a conversion of ammonia of 0.7%.

The treated gases were then admixed with the flue gases containing the same compositions as those of Example 1 at a rate of 20 m.$^3$ per hour to give mixed gases having, in a molar ratio, 69.2% of nitrogen, 8.9% of carbon dioxide, 2.7% of oxygen, 0.9% of argon, 18.3% of steam, 286 p.p.m. of nitrogen monoxide, 12 p.p.m. of nitrogen dioxide, 200 p.p.m. of ammonia and 327 p.p.m. of hydrogen at a rate of 20.5 Nm.$^3$ per hour.

The mixed gases were then passed through 1.5 liters of a vanadium oxide and tungsten oxide catalyst supported on activated alumina with a vanadium to tungsten to alumina atomic ratio of 9 : 3 : 120 packed in a 100 mm. (I.D.) stainless steel reactor at a rate of 20.5 Nm.$^3$ per hour and a space velocity of 13,000 hour$^{-1}$ at 350° C. to give reactor outlet gases containing 8 p.p.m. of ammonia, 23 p.p.m. of nitrogen monoxide and 1 p.p.m. of nitrogen dioxide with a conversion of nitrogen oxides of 91.9% and ammonia of 96.0%. No free hydrogen was observed in the reactor outlet gases.

EXAMPLE 3

The process waste waters containing the same composition were stripped in the same manner to give 9.05 liters per hour of the treated water and 1.21 Nm.$^3$ per hour of the stripped gases having the same compositions, as in Example 1.

Of the stripped gases, the gases were passed at a rate of 0.5 Nm.$^3$ per hour and a space velocity of 5,000 hour$^{-1}$ in a 50 mm. (I.D.) stainless steel reactor packed with 100 ml. of a nickel oxide catalyst supported on activated alumina in a ratio of 30% by weight to give the gases containing, in a molar ratio, 8,250 p.p.m. of ammonia, 12,700 p.p.m. of carbon dioxide, 30 p.p.m. of organic materials, 13,100 p.p.m. of hydrogen and steam as the rest of the gases at a rate of 0.5 Nm.$^3$ per hour. The gases had a conversion of the organic materials of 99.3% with no ammonia decomposed.

The gases thus obtained were then admixed with the flue gases and an additional amount of ammonia to give the gases containing, in a molar ratio, 69.2% of nitrogen, 8.9% of carbon dioxide, 2.7% of oxygen, 0.9% of argon, 18.3% of steam 286 p.p.m. of nitrogen monoxide, 12 p.p.m. of nitrogen dioxide, 540 p.p.m. of ammonia and 320 p.p.m. of hydrogen at a rate of 20.5 Nm.$^3$ per hour.

The mixed gases were passed at a rate of 20.5 Nm.$^3$ per hour and a space velocity of 13,700 hour$^{-1}$ in a 100 mm. (I.D.) stainless steel reactor packed at its upper portion with 1.5 liters of a vanadium oxide and molybdenum oxide supported on activated alumina with a vanadium to molybdenum to aluminum atomic ratio of 9 : 3 : 120 and, at the lower portion thereof, with 1.5 liters of a chromium oxide and vanadium oxide catalyst supported on activated alumina with a chromium to vanadium to aluminum atomic ratio of 9 : 3 : 120 at a temperature of 350° C. to give reactor outlet gases containing 5 p.p.m. of ammonia, 6 p.p.m. of nitrogen monoxide and 0.1 p.p.m. or less of nitrogen dioxide with a conversion of nitrogen oxides of 98.0% and ammonia of 99.1%.

The invention being thus described, it will be obvious that the same may be varied in many ways. Such variations are not to be regarded as a departure from the spirit and scope of the invention, and all such modifications as would be obvious to one skilled in the art are intended to be included herein.

What we claim is:

1. In a process for concurrently treating process waste waters and flue gases discharged from an ammonia-synthesis gas manufacturing plant obtained by reforming hydrocarbons with steam, said process waste waters containing ammoniacal nitrogens and organic materials consisting essentially of methanol and a small amount of organic amines, which are derived from the condensation of the steam, and said flue gases containing nitrogen oxides, which are derived from the combustion of hydrocarbon fuels for generating heat and power required for reforming the hydrocarbons, the improvement which comprises stripping the ammoniacal nitrogens and the organic materials present in the waste waters in gaseous form, decomposing methanol in the resulting stripped gas with a first catalyst for selectively decomposing methanol to carbon dioxide and water or to carbon dioxide, water and hydrogen, at a temperature of from 120° to 400°C. while the ammonia is left undecomposed, mixing the resulting gases with the flue gases so as to provide a gaseous mixture containing ammonia therein in an amount of 0.3 to 10 moles per mole of nitrogen oxides, and reducing the nitrogen oxides with the ammonia by bringing the resulting gaseous mixture into contact with a second catalyst for reducing the nitrogen oxides to nitrogen gas and water at a temperature of from 150° to 700°C.

2. The process according to claim 1, further including the step of bringing the resulting gaseous mixture, after contact with said additional catalyst, into contact with a catalyst capable of decomposing any unreacted ammonia by oxidation into nitrogen and water.

3. The process according to claim 1, wherein said first catalyst is a metal selected from the group consisting of iron, nickel, chromium, zinc and copper or an oxide of said metal or complex of an oxide of said metal.

4. The process according to claim 3, wherein the catalyst is nickel oxide, iron oxide-chromium oxide, zinc oxide-copper oxide or zinc oxide-chromium oxide.

5. The process according to claim 1, wherein the temperature at which the methanol present in the stripped gases is decomposed is from 150° to 400° C. when no oxygen is present therein.

6. The process according to claim 1, wherein the temperature at which the methanol present in the stripped gases is decomposed is from 120° to 250° C. when oxygen is present therein.

7. The process according to claim 1, wherein the stripped gas is brought into contact with said first catalyst at a space velocity of 500 to 50,000 hour$^{-1}$.

8. The process according to claim 7, wherein the space velocity is from 1,000 to 30,000 hour$^{-1}$.

9. The process according to claim 1, wherein the temperature at which the nitrogen oxides are reduced with ammonia in the presence of said second catalyst is from 150° to 500°C.

10. The process according to claim 1, wherein a mixture of the stripped gas and the flue gas is brought into contact with said second catalyst at a space velocity of 2,000 to 100,000 hour$^{-1}$.

11. The process according to claim 10, wherein the space velocity is from 6,000 to 30,000 hour$^{-1}$.

12. The process according to claim 2, wherein the catalyst over which the unreacted ammonia is decomposed by oxidation is a chromium oxide, an iron-chromium system complex oxide, a chromium-magnesia complex oxide or a complex oxide containing chromium and a component Z in which Z is one or more of tin, antimony, vanadium, cobalt, phosphorus, zinc, nickel, titanium, molybdenum or tungsten.

13. The process according to claim 2, wherein the temperature at which the gaseous mixture is contacted with said catalyst in said further step is from 150° to 700°C.

14. The process according to claim 13, wherein the temperature is from 200° to 500° C.

15. The process according to claim 2, wherein the space velocity at which the gaseous mixture is contacted with said catalyst in said further step is from 2,000 to 100,000 hour$^{-1}$.

16. The process according to claim 15, wherein the space velocity is from 6,000 to 30,000 hour$^{-1}$.

17. The process according to claim 1, wherein the stripped gases, after the methanol present therein is decomposed, are mixed with the flue gases so as to provide a gaseous mixture having ammonia therein in an amount of 0.7 to 5 moles of the nitrogen oxides.

18. The process according to claim 1, wherein said second catalyst is (1) platinum, (2) palladium, (3) an oxide of a metal selected from the group consisting of copper, chromium, vanadium, molybdenum and tungsten, (4) a complex oxide of copper/chromium, iron/chromium or manganese/chromium, (5) a complex oxide containing vanadium and a component X in which X is one or more of copper, zinc, tin, lead, titanium, phosphorus, cobalt, nickel, tungsten or molybdenum, or (6) a complex oxide containing chromium and a component Y in which Y is one or more of nickel, cobalt, zinc, molybdenum, tungsten, tin, phosphorus or titanium.

19. The process according to claim 1, wherein ammonia in gaseous or aqueous solution form or in the form of an aqueous solution of ammonium carbonate is added to the stripped gas obtained after contact with said first catalyst.

* * * * *